United States Patent [19]
Nishio

[11] Patent Number: 5,826,125
[45] Date of Patent: Oct. 20, 1998

[54] CAMERA WHICH USES FILM CARTRIDGE HAVING A MOVABLE LIGHT SHIELD DOOR

[75] Inventor: Tetsuya Nishio, Kawasaki, Japan

[73] Assignee: Canon Kabushiki Kaisha, Tokyo, Japan

[21] Appl. No.: 766,938

[22] Filed: Dec. 16, 1996

Related U.S. Application Data

[63] Continuation of Ser. No. 689,009, Jul. 30, 1996, abandoned, which is a continuation of Ser. No. 591,940, Jan. 23, 1996, abandoned, which is a continuation of Ser. No. 304,946, Sep. 13, 1994, abandoned.

[30] Foreign Application Priority Data

Sep. 20, 1993 [JP] Japan ................................ 5-233357

[51] Int. Cl.⁶ ............................ G03B 17/02; G03B 17/26
[52] U.S. Cl. .......................... 396/538; 396/513; 396/516
[58] Field of Search ................................... 396/513, 516, 396/535, 538, 512, 348

[56] References Cited

U.S. PATENT DOCUMENTS

| 4,841,319 | 6/1989 | Hansen .................................... 354/275 |
| 4,938,429 | 7/1990 | Robertson et al. ..................... 242/71.1 |
| 5,105,211 | 4/1992 | Kameyama ......................... 354/174 X |
| 5,200,777 | 4/1993 | Zander .................................... 354/275 |
| 5,231,438 | 7/1993 | Smart .................................. 354/288 X |
| 5,248,108 | 9/1993 | Zander ................................ 354/275 X |
| 5,307,099 | 4/1994 | Kawamuro et al. ................ 354/275 X |
| 5,317,355 | 5/1994 | Zander et al. ........................... 354/277 |
| 5,319,406 | 6/1994 | Takatori ................................. 354/275 |
| 5,319,407 | 6/1994 | DiRisio .................................. 354/275 |
| 5,526,084 | 6/1996 | Kataoka et al. ........................ 354/275 |

FOREIGN PATENT DOCUMENTS

3-116136  5/1991  Japan .
4-80734   3/1992  Japan .

Primary Examiner—A. A. Mathews
Attorney, Agent, or Firm—Fitzpatrick, Cella, Harper & Scinto

[57] ABSTRACT

A camera or apparatus adapted to use an image recording medium cartridge having a cover for allowing an image recording medium to come out from or enter into the image recording medium cartridge. The camera or apparatus includes a cartridge loading device for loading the cartridge and for moving the cartridge to an accommodating position where the cartridge is accommodated in the camera or apparatus or a taking-out position where the cartridge is taken out of the camera or apparatus; a cover opening device for opening the cover of the cartridge; and a linkage device for preventing the cover opening device from opening the cover of the cartridge when the cartridge loading device is in the taking-out position.

84 Claims, 11 Drawing Sheets

CAMERA WHICH USES FILM CARTRIDGE HAVING A MOVABLE LIGHT SHIELD DOOR

This application is a continuation of application Ser. No. 08/689,009 filed Jul. 30, 1996, which is a continuation of application Ser. No. 08/591,940 filed Jan. 23, 1996, which is a continuation of application Ser. No. of 08/304,946 filed Sep. 13, 1994, all now abandoned.

BACKGROUND OF THE INVENTION

1. Field of the Invention

The present invention relates to a camera using a film cartridge having a movable light shield door for opening and closing a film loading/unloading window and, in particular, to an improved cartridge loading chamber for a camera to be loaded with such a cartridge.

2. Description of the Related Art

Conventional film cartridges equipped with a movable light shield door are disclosed, for example, in Japanese Patent Laid-Open No. 3-116136, U.S. Pat. No. 4,938,429, etc. Cameras in which a cartridge chamber for holding a film cartridge is movable between an accommodating position in which it is accommodated within the camera body and a taking-out position in which it protrudes outwards from the camera body is disclosed in Japanese Patent Laid-Open No. 4-80734, U.S. Pat. No. 4,841,319, etc.

Assuming that a film cartridge as disclosed in the above-mentioned publications is used in a camera as disclosed in the above-mentioned publications, there is a danger that the movable light shield door of the cartridge may open and allow light to enter the cartridge to cause exposure of the film if the film cartridge is in the taking-out position, in which it protrudes outwards from the camera body, during loading or unloading of the film cartridge. Thus, such a camera is not suited to be used in such a film cartridge.

SUMMARY OF THE INVENTION

In one aspect of the present invention, there is provided a camera or apparatus adapted to use an image recording medium cartridge having a cover for allowing an image recording medium to come out from or enter into the image recording medium cartridge, the camera comprising: cartridge loading means for loading the cartridge and for moving the cartridge to an accommodating position where the cartridge is accommodated in the camera or a taking-out position where the cartridge is taken out of the camera; cover opening means for opening the cover of the cartridge; and linkage means for preventing the cover opening means from opening the cover of the cartridge when the cartridge loading means is in the taking-out position, wherein it is possible, even with a cartridge loading means movable from the accommodated and protruding positions, to prevent, by means of a simple structure the cover of the cartridge from opening to allow intrusion of light when the cartridge is being put in or taken out of the camera or apparatus.

Other aspects of the present invention will become apparent from the following description of a specific embodiment.

DESCRIPTION OF THE PREFERRED EMBODIMENTS

An embodiment of the present invention will now be described with reference to the drawings.

Figure 1:
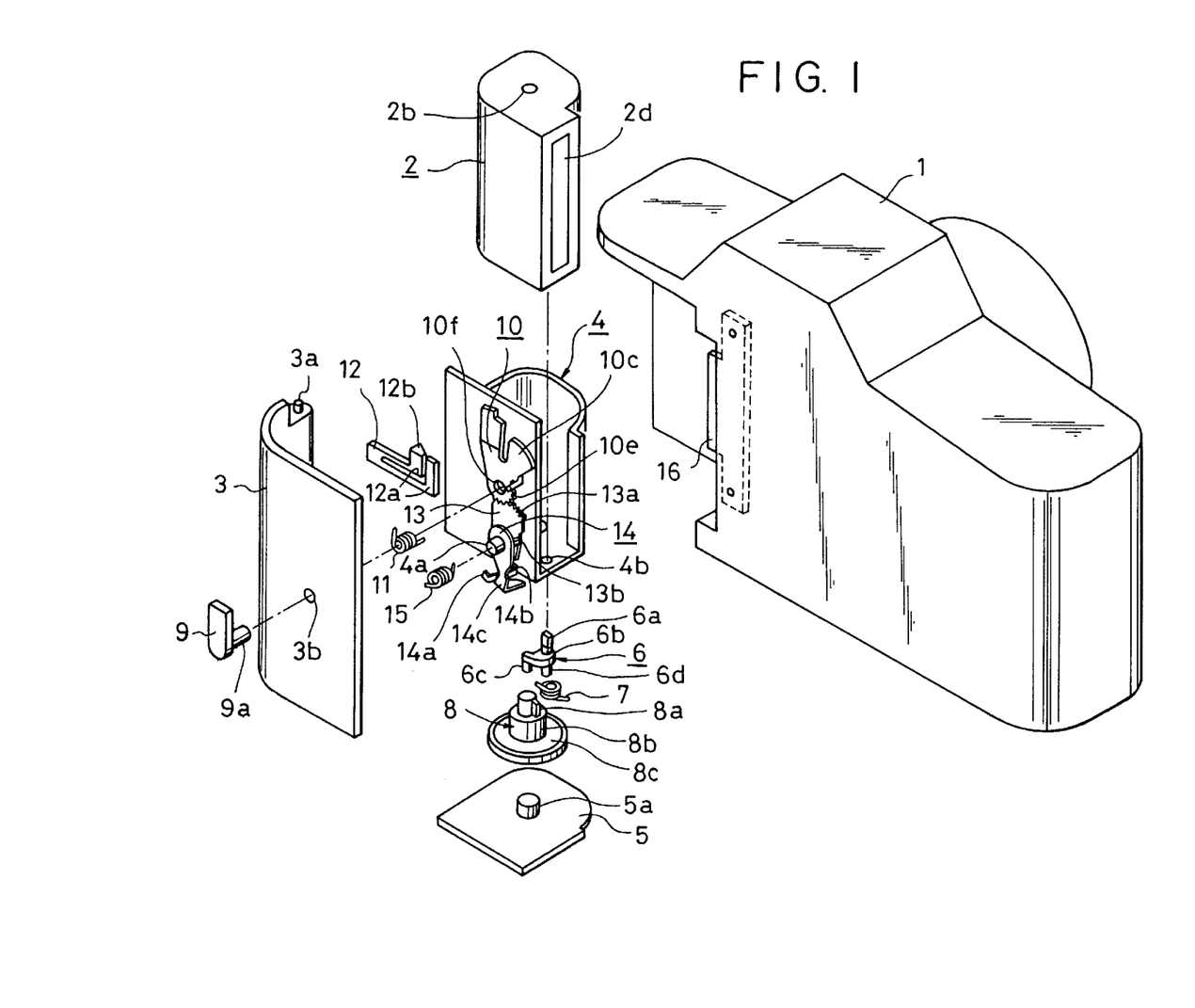
FIG. 1 is an exploded perspective view of the essential part of a camera according to an embodiment of the present invention.
Figure 2:
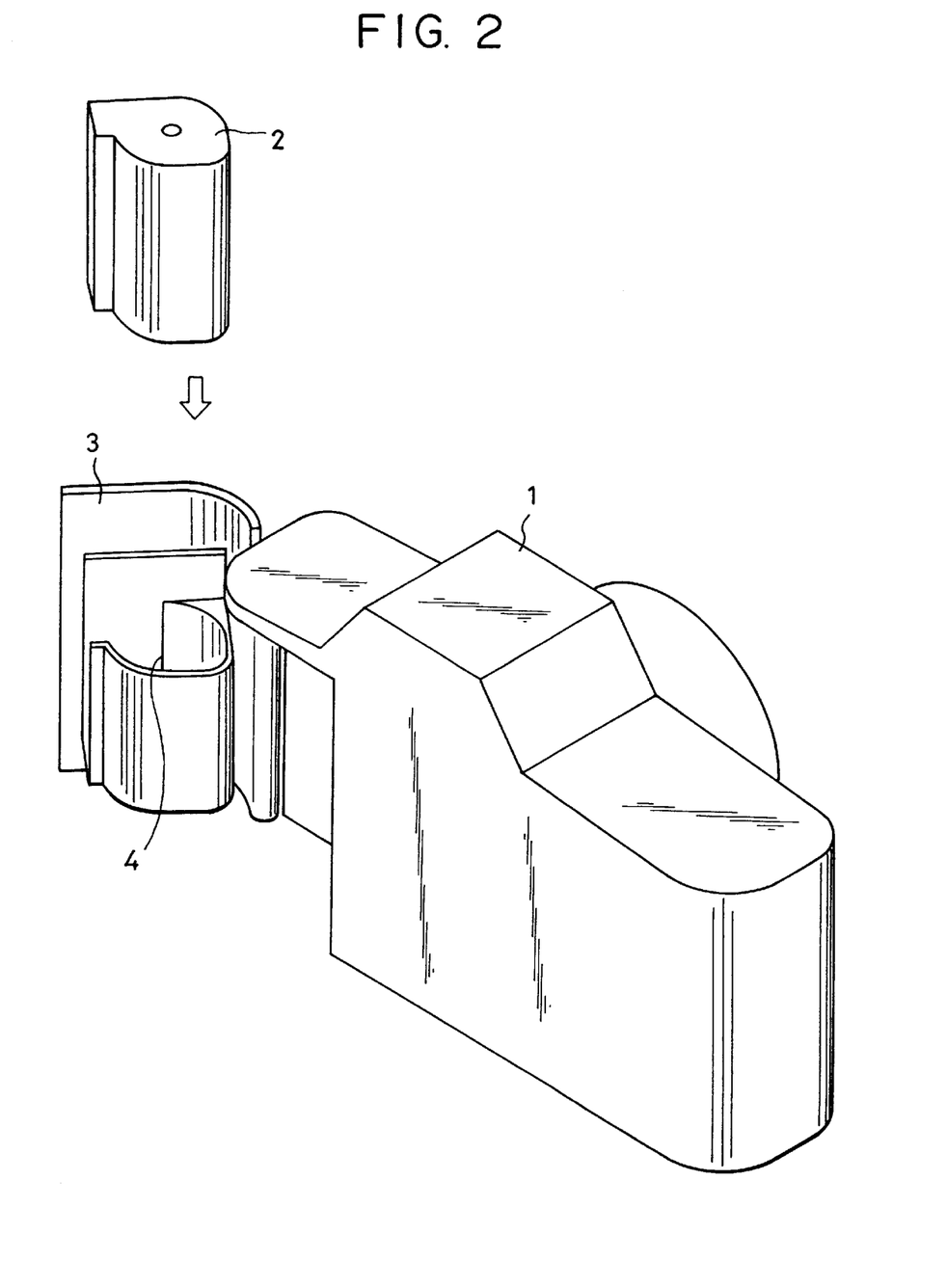
FIG. 2 is a diagram showing how a cartridge chamber 4 is drawn out of a camera body 1 and loaded with a film cartridge 2.
Figure 3:
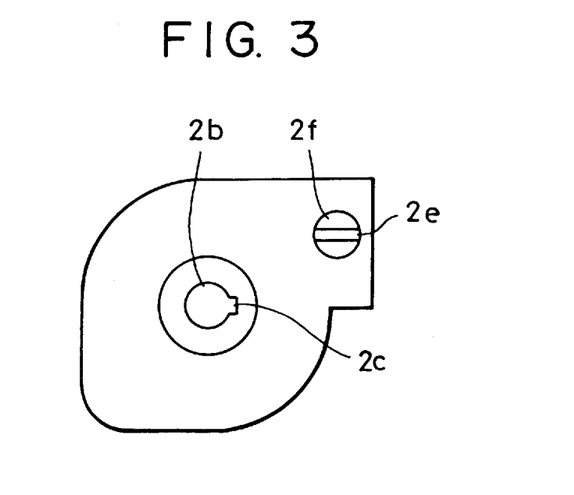
FIG. 3 is a bottom view of the film cartridge 2.

FIG. 1 is an exploded perspective view of the essential part of a camera according to an embodiment of the present invention; FIG. 2 is a perspective view showing how a cartridge chamber 4 is opened to load a film cartridge 2; and FIG. 3 is a bottom view of a film cartridge used in the camera according to the embodiment of the present invention, In FIGS. 1 through 3, numeral 1 indicates a camera body 1; numeral 2 indicates a film cartridge; numeral 2b (FIG. 3) indicates a film take-up shaft; numeral 2c indicates a key way provided in the film take-up spool; and numeral 2d indicates a movable light shield door. Numeral 2f indicates a shaft for opening and closing the movable light shield door 2d. An engagement groove 2e adapted to be engaged with the key section of an opening/closing shaft 6, described below, is formed in an end surface of the shaft 2f. In the state shown in FIG. 1, the movable light shield door 2d is in the closed state.

In FIG. 3, rotating the shaft 2f clockwise causes the movable light shield door 2d to open. Rotating the film take-up spool 2b clockwise causes the film (not shown) to be fed from the film cartridge 2, and rotating the film take-up spool 2b counterclockwise causes the film to be re-wound.

Numeral 3 indicates a back cover for opening and closing the cartridge chamber 4; numeral 3a indicates a hinge axle, and numeral 3*b* indicates a hole into which an operating knob 9 is fitted. The back cover 3 is rotatably supported on the camera body 1 by means of the hinge axle 3*a*.

Numeral 4 indicates a cartridge chamber; numeral 4*a* indicates a lever axle for rotatably supporting two levers described below; and numeral 4*b* indicates a fitting hole into which a shaft section 6*b* of the opening/closing shaft member 6, which will be described below, is fitted. Provided in the bottom surface of the cartridge chamber 4 are the above-mentioned hole 4*b* and a fitting hole through which a film driving shaft 8 is to be fitted. The cartridge chamber 4 is secured to the back cover 3.

Numeral 5 indicates a bottom board covering the outer side of the bottom plate of the cartridge chamber 4, and numeral 5*a* indicates a shaft fitted into a hole (not shown) of the film driving shaft 8 in such a way as to be capable of making a relative rotation and relative axial movement. The bottom board 5 is fastened to the cartridge chamber 4 and to the back cover 3.

The above-mentioned opening/closing shaft 6 for opening and closing the movable light shield door 2*d* of the film cartridge 2 includes: an opening/closing key 6*a*; a shaft section 6*b*; a driven pin 6*c*; and a shaft section 6*d* constituting the center of rotation. The opening/closing shaft 6 is rotatably fitted into the fitting hole 4*b* of the cartridge chamber 4, and the opening/closing key 6*a* protrudes into the cartridge chamber 4 and engages with the engagement groove 2*e* of the shaft 2*f* of the cartridge 2. By rotating the shaft 6*b*, the movable light shield door 2*d* is opened or closed.

Numeral 7 indicates a return spring fitted onto the shaft section 6*d*. The driven pin 6*c*, which is secured to the forward end of a horizontal arm of the opening/closing shaft 6, is driven by a driving lever 14 described below.

The above-mentioned film driving shaft 8 includes: a driving key 8*a*; a shaft section 8*b*; and a gear 8*c* secured to the shaft section 8*b*. The shaft section 8*b* of the film driving shaft 8 is rotatably fitted into a fitting hole (not shown) of the bottom plate of the cartridge chamber 4, and the shaft 5*a* of the bottom board 5 is fitted into a fitting hole (not shown) in the lower end surface of the shaft section 8*b* in such a way as to be capable of making a relative rotation and a relative axial movement. The driving key 8*a* is engaged with the key groove 2*c* of the cartridge 2. The gear 8*c* is in mesh with a driving gear (not shown) of the camera body 1. When the film driving shaft 8 is rotated by this driving gear, the driving shaft 2*b* of the cartridge 2 is rotated to pay out or rewind the film. The gear 8*c* of the film driving shaft 8 is fitted onto the shaft 5*a* of the bottom board 5 in such a way as to be axially movable, so that the driving key 8*a* is capable of axially advancing and retreating. If it is out of phase with the key groove 2*c*, phase adjustment between the key 8*a* and the key groove 2*c* is possible in the early stage of rotation of the driving shaft 2*b*.

The above-mentioned operating knob 9 includes a shaft 9*a*, which is rotatably fitted into the fitting hole 3*b* of the back cover 3.

Numeral 10 indicates a lock bar, and numeral 10*f* indicates a fitting hole, into which the shaft 9*a* of the operating knob 9 is fitted in such a way as to be incapable of making a relative rotation. Rotating the operating knob 9 causes the lock bar 10 to rotate correspondingly.

Numeral 11 indicates a main spring fitted onto the shaft 9*a*.

Numeral 12 indicates a lock member for locking the lock bar 10; numeral 12*a* indicates a first lock section; and numeral 12*b* indicates a second lock section. The lock member 12, which is secured to the cartridge chamber 4, is bent by being pushed by pins 1*a* and 1*b* (See FIG. 7) of the camera body 1, thereby releasing the lock of the lock bar 10.

Numeral 13 indicates a sector lever, and numeral 14 indicates a driving lever. Both levers 13 and 14 are rotatably supported by the lever shaft 4*a* of the cartridge chamber 4. Numeral 15 indicates an overload absorbing spring that is fitted onto the shaft 4*a*. Numeral 16 indicates a lock bar, which is secured to the camera body 1.

In the state shown in FIG. 2, the back cover 3 is opened to bring the cartridge chamber 4 to the projected position, with the cartridge 2 being loaded into the cartridge chamber 4 from above. In this state, the opening/closing key 6*a* of the opening/closing shaft 6 is engaged with the engagement groove 2*e* of the shaft 2*f* of the cartridge 2. Further, the driving key 8*a* of the film driving shaft 8 is engaged with the key groove 2*c* of the cartridge 2.

Next, the structure and function of the lock bar 10, the sector lever 13, the lock member 12, etc. will be described in detail with reference to FIGS. 4 through 11.

The lock bar 10 has a first lock section 10*a*, a second lock section 10*b*, a lock arm 10*c*, a spring peg 10*d*, and a gear 10*e*.

The sector lever 13 includes a gear 13*a*, a spring peg 13*b*, and a stopper 13*c*. The driving lever 14 includes a spring peg 14*a*, a stopper 14*b*, and an opening/closing shaft driving section 14*c*. Numeral 3*c* indicates a spring peg protruding from the back cover 3 of the cartridge chamber 4; numeral 4*d* indicates a spring peg protruding in the cartridge chamber 4; and numerals 4*e* and 4*f* indicate stoppers.

The main spring 11, which is fitted onto the shaft 9*a* of the operating knob 9, has its arms bearing on the spring pegs 3*c* and 10*d* so as to bias the lock bar 10 toward clockwise rotation.

Figure 5:
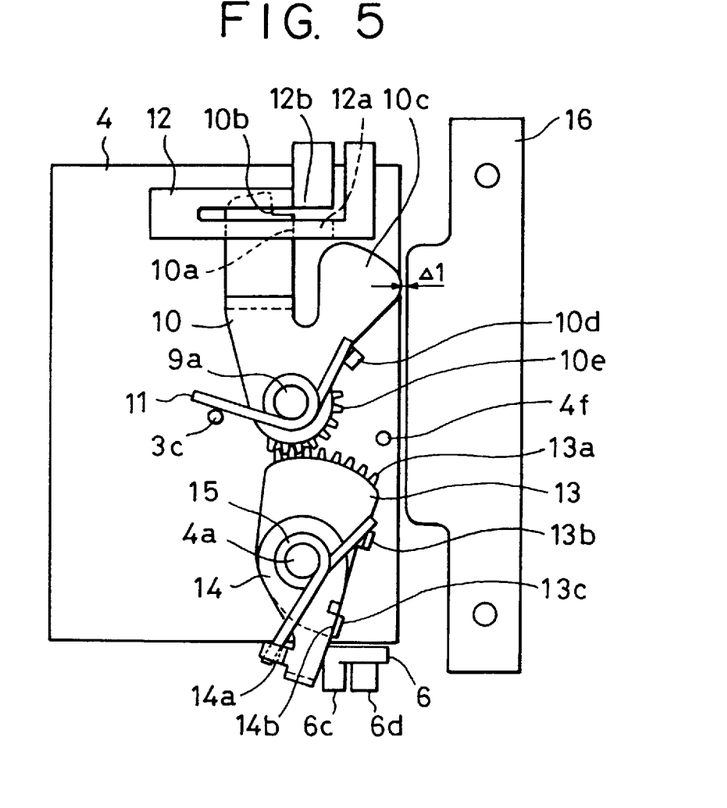
FIG. 5 is a front view of the essential part of the opening/closing device.

The spring 15, which is fitted onto the shaft 4*a* of the cartridge chamber 4, has its arms bearing on the spring pegs 13*b* and 14*a*. Thus, the driving lever 14 is biased toward counterclockwise rotation with respect to the sector lever 13. As shown in FIG. 5, the moment the stopper sections 14*b* and 13*c* of these levers abut against each other, the two lever starts to rotate in a body, and any overload on the driving lever 14 is absorbed by the spring 15. The gear 10*e* of the lock bar 10 and the gear 13*e* of the sector lever 13 are in mesh with each other, whereby the torque due to the main spring 11 or the torque applied by turning the operating knob 9 is transmitted to the sector lever 13 and the driving lever 14.

Figure 6:
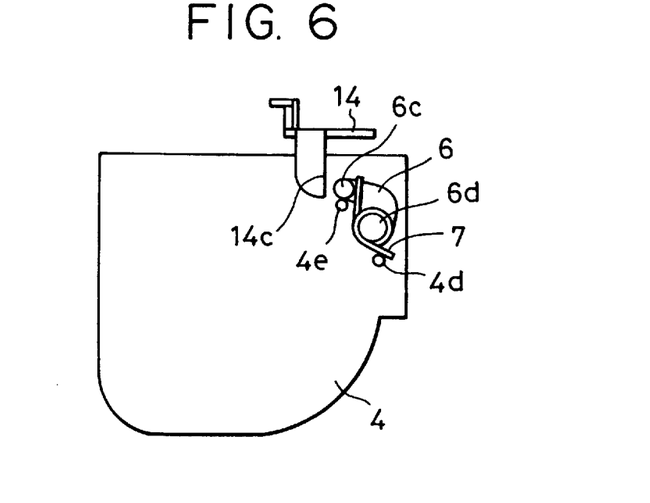
FIG. 6 is a bottom view of a driving lever 14 and an open/close shaft 6 of the device.

The return spring 7, which is fitted onto the shaft section 6*d* of the opening/closing shaft 6, has its arms bearing on the driven pin 6*c* of the shaft 6 and on the spring peg 4*d*, thereby biasing the opening/closing shaft 6 toward counterclockwise rotation (as seen in FIG. 6), that is, biasing the movable light shield door 2*d* in the closing direction.

Figure 8:
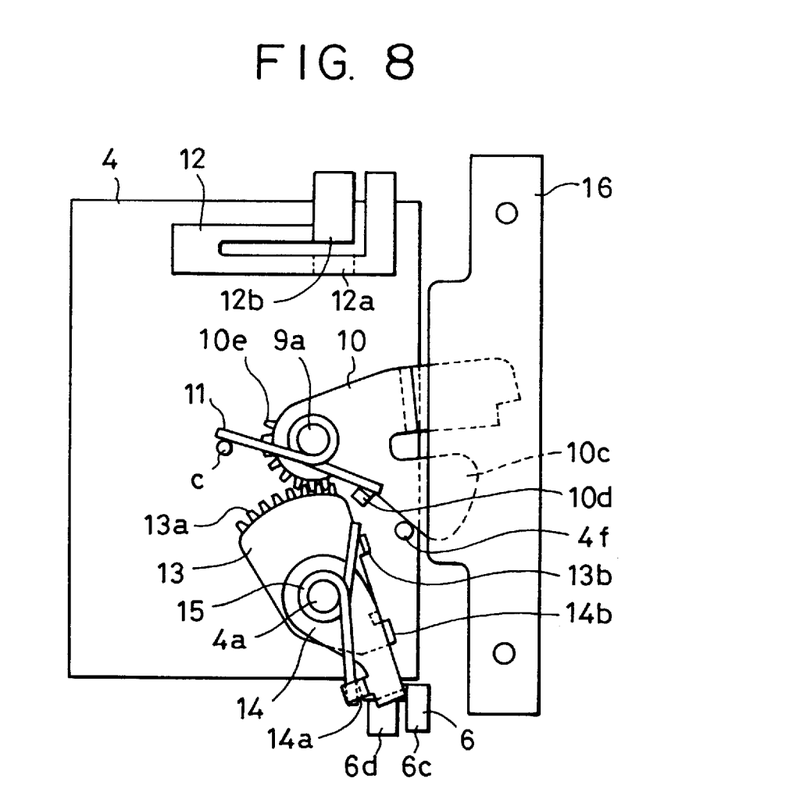
FIG. 8 is a front view of the opening/closing device.

When the lock bar 10 further rotates clockwise from the position of FIG. 5, and the lock arm 10*c* is rotated to a position behind the lock bar 16, as shown in FIG. 8, the lock arm 10 and the lock bar 16 are engaged with each other, thereby locking the back cover 3. Thus, the back cover 3 cannot be opened by pulling it. In the state shown in FIG. 5, the first lock section 12*a* of the lock member 12 engages with the first lock section 10*a* of the lock bar 10, thereby preventing the lock bar 10 from rotating clockwise.

When the driving lever 14 rotates counterclockwise from its position of FIG. 5 to that shown in FIG. 8, the driving section 14c pushes the driven pin 6c of the opening/closing shaft 6 to the right, with the result that the opening/closing shaft 6 rotates clockwise around the shaft section 6d. As a result, the shaft 2f of the cartridge 2, engaged with the key 6a, rotates clockwise (as seen in FIG. 3), thereby opening the movable light shield door 2d.

Figure 4:
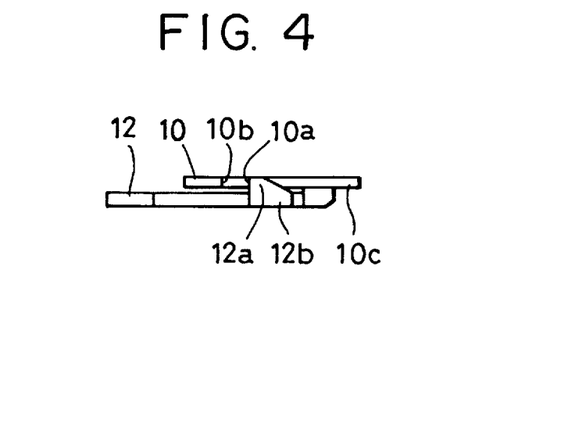
FIG. 4 is a top view showing how a lock bar 10 of an opening/closing device for a movable light shield door, provided in the camera, is engaged with a lock member 12.

In the condition shown in FIGS. 4 through 6, the lock bar 10 is locked by the lock member 12. As shown in FIGS. 4 and 5, the first lock section 10a of the lock bar 10 abuts against the first lock section 12a of the lock member 12, and the clockwise torque due to the main spring 11 is applied to the lever 10, whereby the lock section 10a of the lever 10 is brought into press contact with the lock section 12a of the lock member 12.

In this condition, the sector lever 13 and the driving lever 14 are in the phase shown in FIG. 5, and, as shown in FIG. 6, the driving section 14c of the driving lever 14 and the driven pin 6c of the opening/closing shaft 6 are separated from each other. The opening/closing shaft 6 is biased by the return spring 7 toward counterclockwise rotation (as seen in FIG. 6) around the shaft section 6d, and the driven pin 6c of the shaft 6 abuts against the stopper 4e, so that the opening/closing shaft 6 keeps the movable light shield door 2d of the film cartridge 2 in the closed state. In this condition, there is a clearance Δ1 between the lock arm 10c of the lock bar 10 and the lock bar 16, so that the back cover 3 can be pulled open (FIG. 1).

When the back cover 3 is in the open state, the opening/closing key 6a is in the phase to close the movable light shield door 2d, so that the cartridge 2 can be loaded into the cartridge chamber 4. Further, since the light shield door 2d of the cartridge, loaded into the cartridge chamber 4, remains closed, the film in the cartridge is maintained in the shielded state.

Figure 7:
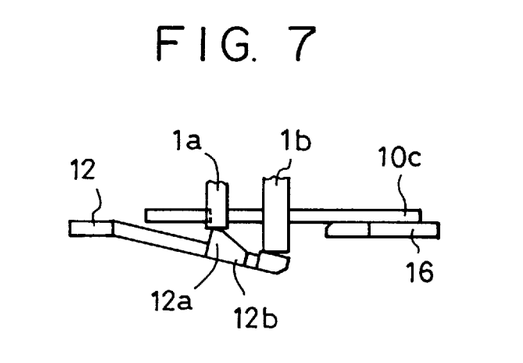
FIG. 7 is a top view showing the positional relationship between the lock bar 10, the lock member 12 and the camera body in the state different from that shown in FIG. 4.
Figure 9:
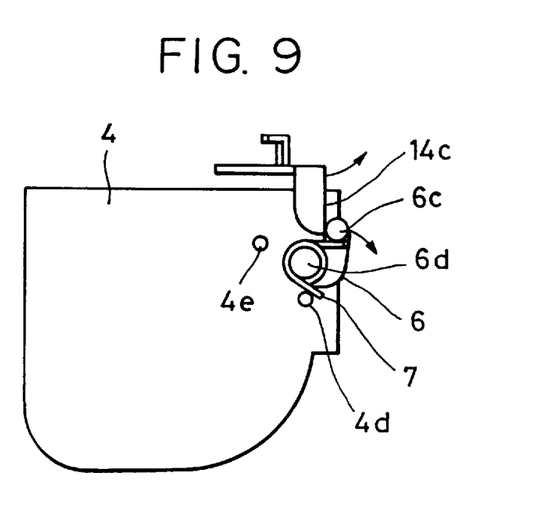
FIG. 9 is a bottom view showing the positional relationship between the driving lever 14 and the opening/closing shaft 6.

FIGS. 7 through 9 show the condition in which the lock of the lock bar 10 has been released. As the back cover 3 is closed from the position of FIGS. 4 through 6, the first and second lock sections 12a and 12b of the lock member 12 come to abut against the pins 1a and 1b of the camera body, with the result that the lock member 12 is deformed. When the back cover 3 is completely closed to shield the cartridge chamber 4 from light, the lock of the lock bar 10 is released.

Then, the lock bar 10 is rotated clockwise by the main spring 11 as shown in FIG. 8 until it comes to a stop by abutting against the stopper 4f. In this process, the lock arm 10c reaches a position behind the lock bar 16, thereby locking the back cover 3 so that it cannot be pulled open (FIG. 1). As the lock bar 10 rotates, the sector lever 13 and the driving lever 14 are rotated counterclockwise, as shown in FIG. 8, and the driving section 14c of the driving lever 14 pushes the driven pin 6c of the opening/closing shaft 6 to the right, as shown in FIG. 9, so that the shaft section 6d of the opening/closing shaft 6 is rotated clockwise (as seen in FIG. 9), resulting in the movable light shield door 2d of the cartridge 2 being opened.

It can happen that the movable light shield door 2d fails to be opened when the lock bar 10 is at the stop position where it abuts against the stopper 4f, and opens before the lock bar 10 has reached the stop position, due to errors in the cartridge 2, errors in the camera parts, etc. Such a condition is shown in FIGS. 10 and 11.

Figure 10:
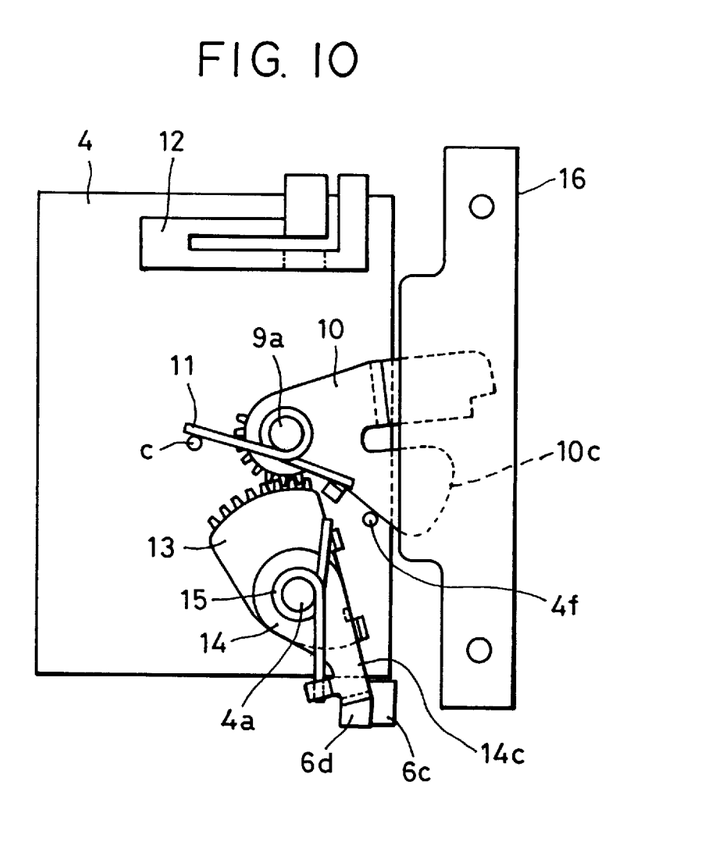
FIG. 10 is a front view of the opening/closing device in a different condition.
Figure 11:
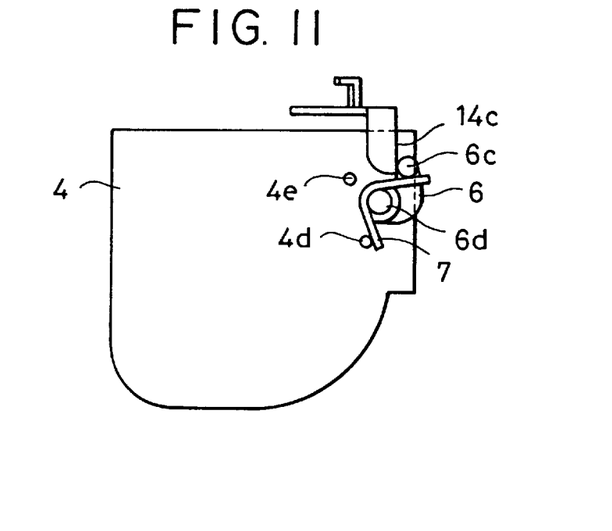
FIG. 11 is a bottom view showing the positional relationship between the driving lever 14 and the opening/closing shaft 6.

FIGS. 10 and 11 show a condition in which the shaft 2f abuts against a stopper (not shown) inside the cartridge 2 to stop the opening/closing shaft 6.

In FIG. 10, the driving lever 14 is in the position shown in FIG. 10 because the opening/closing shaft 6 cannot rotate.

In this condition, the sector bar 13 and the lock bar 10 have rotated to their stop position due to the overload absorbing effect of the spring 15. Due to this absorbing effect, the opening/closing shaft 6 is protected from an excessive force, thereby ensuring the engagement between the lock arm 10c and the lock bar 16.

When the operating knob 9 is turned counterclockwise from the position shown in FIGS. 7 through 9 to the lock releasing position for the lock bar 10, and the back cover 3 is opened, the lock member 12 is restored to its former position, so that the first lock section 12a of the lock member 12 locks the first lock section 10a of the lock bar 10, as shown in FIG. 5, thereby locking the lock bar 10.

Figure 12:
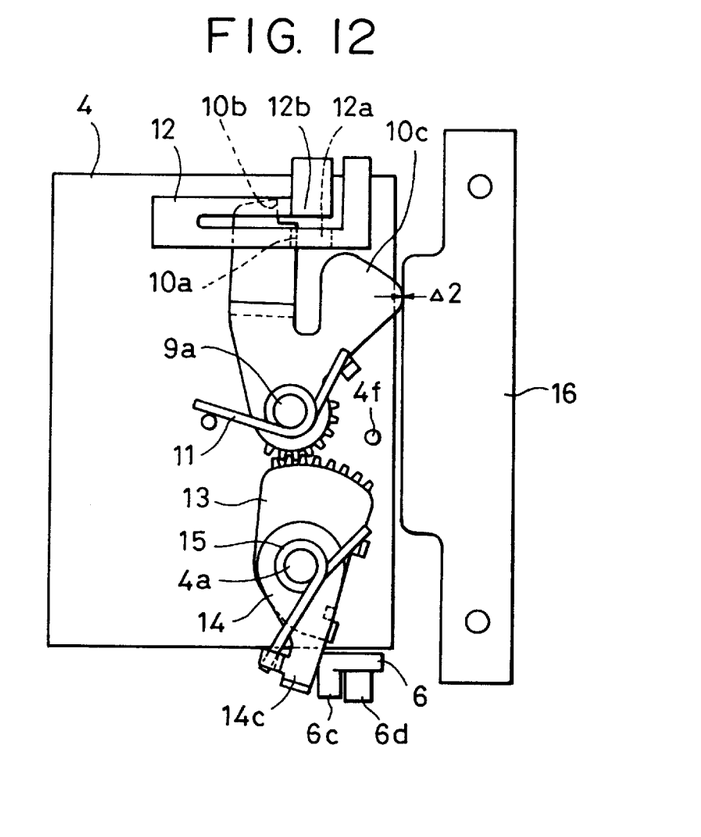
FIG. 12 is a front view of the opening/closing device in a different state.

In the condition shown in FIG. 12, there is a clearance Δ2 (<Δ1) between the lock arm 10c and the lock bar 16. In this condition, neither the lock section 10a nor 10b of the lock bar 10 is locked. Further, due to the clearance Δ2 between the lock arm 10c and the lock bar 16, the back cover 3 can be opened.

Figure 13:
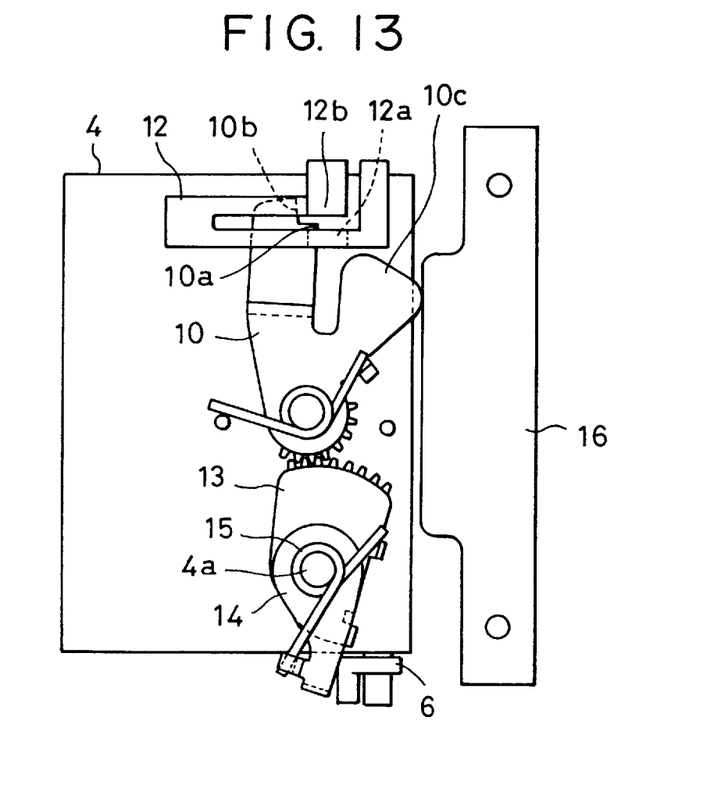
FIG. 13 is a is a front view of the opening/closing device in a different condition.

In this condition, when the back cover 3 is opened and the operating knob 9 is turned clockwise, the forward end of the lock arm 10c abuts against the lock bar 16, as shown in FIG. 13, and no further clockwise rotation is possible for the lock bar 10 until the lock arm 10c comes to the front side of the lock bar 16.

Figure 14:
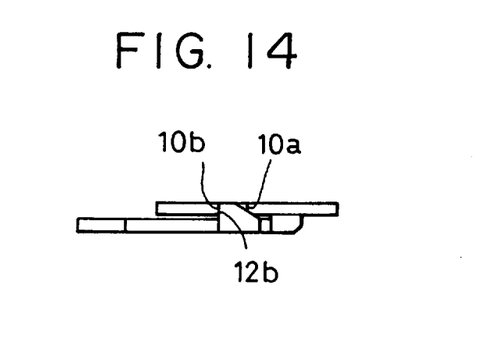
FIG. 14 is a plan view showing how the lock bar 10 and the lock member 12 in a different condition are engaged with each other.
Figure 15:
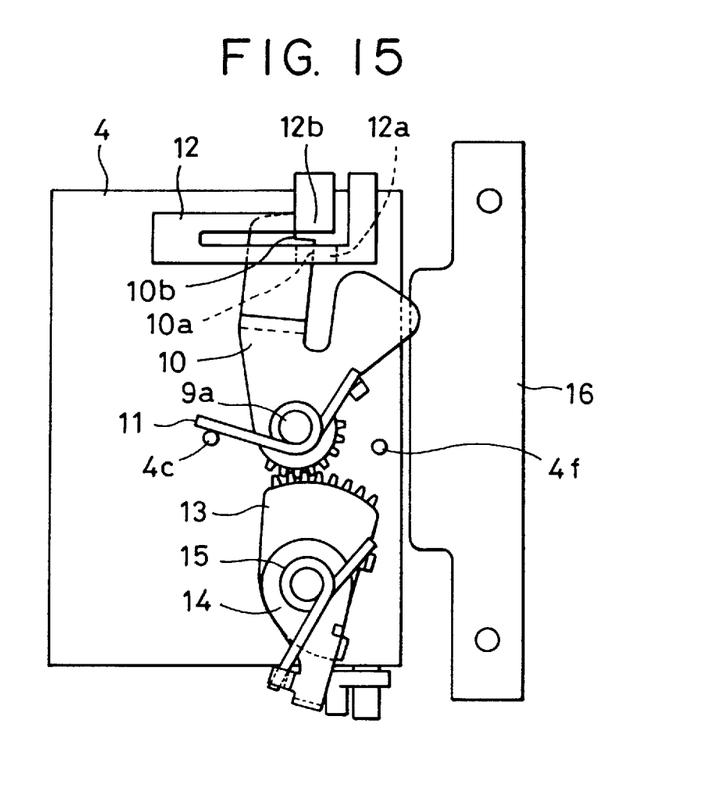
FIG. 15 is a front view of the opening/closing device.
Figure 16:
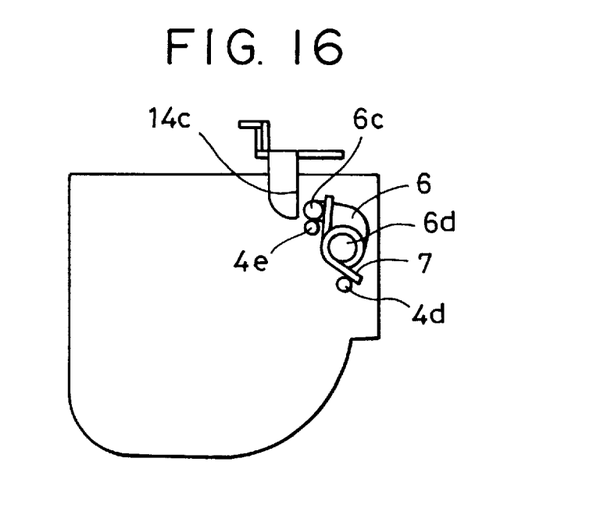
FIG. 16 is a bottom view showing the positional relationship between the driving lever 14 and the opening/closing shaft 6.

When the back cover 3 is further opened, and the lock arm 10c comes to the front side of the lock bar 16 as shown in FIG. 15, the lock member 12 is restored to the former position as shown in FIG. 14. In this condition, when the driving lever 14 and the sector lever 13 are rotated clockwise by turning the operating knob 9 clockwise or by the torque due to the main spring 11, the second lock section 12b of the lock member 12 locks the second lock section 10b of the lock bar 10, thereby locking the lock bar 10. In this state, there is a clearance between the driving section 14c of the driving lever 14 and the driven pin 6c of the opening/closing shaft 6, as shown in FIG. 16, and, since the pin 6c abuts against the stopper 4e to be stopped thereby, the movable light shield door 2d is in the closed state. In this state, if the back cover 3 is opened, there is no fear of light entering the cartridge 2.

In the state shown in FIG. 15, when the back cover 3 is closed the lock arm 10c and the lock bar 16 are engaged with each other, so that the back cover 3 cannot be closed any further. However, by turning the operating knob 9 counterclockwise to release the engagement between the lock arm 10c and the lock arm 16 and then further closing the back cover 3, the condition shown in FIGS. 7 through 9 is attained, and the cartridge 2 remains shielded from light all the while.

Figure 17:
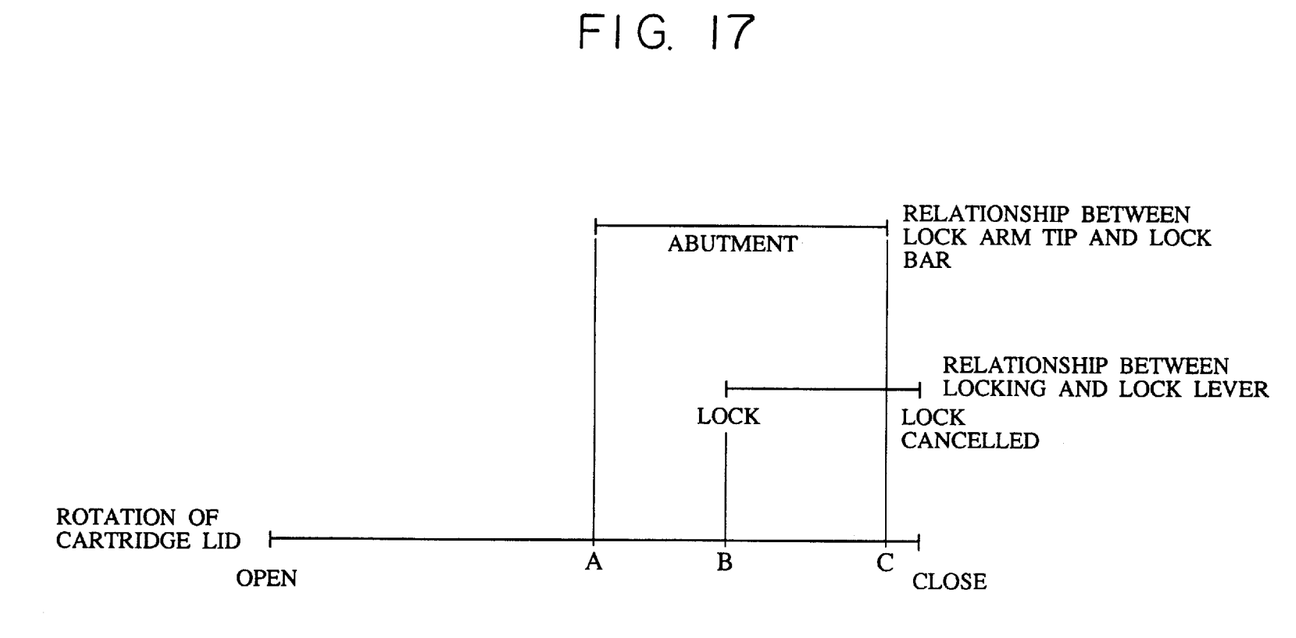
FIG. 17 is a timing chart for illustrating the movement of the components of the opening/closing device of FIG. 4.
Figure 18:
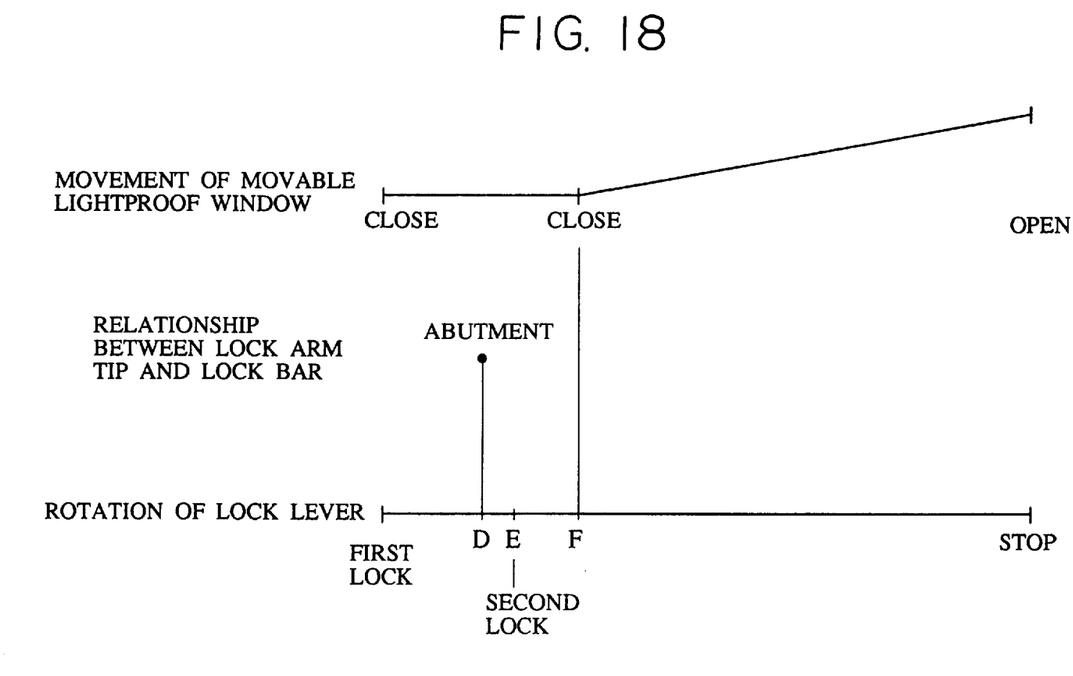
FIG. 18 is a timing chart for illustrating the movement of the components of the opening/closing device.

FIGS. 17 and 18 are timing charts illustrating the operation of the above-described components.

In FIG. 17, as the back cover 3 is closed from the completely open state (the state shown in FIGS. 4 through 6), the lock sections 12a and 12b of the lock member 12 come to abut against the pins 1a and 1b of the camera body 1 at point B. When the back cover 3 is further closed, the lock by the lock member 12 of the lock bar 10 is released. At this time, the lock arm 10c is positioned behind the lock bar 16, so the lock arm 10c does not abut against the lock bar 16. The lock bar 10 is caused to rotate clockwise by the main spring 11 to be brought to the condition shown in FIGS. 7 through 9, with the result that the back cover 3 is locked.

When the back cover 3 is opened in the state in which the operating knob 9 has been turned counterclockwise from the position shown in FIGS. 7 through 9 to bring the lock bar 10 to the state shown in FIG. 5 or 12, the engagement of the pins 1a and 1b of the camera body 1 with the lock sections 12a and 12b of the lock member 12 is released, so that the lock member 12 is restored to the state in which it can lock the lock bar 10. When the back cover 3 is in the phase between points C and B, the forward end of the lock arm 10c abuts against the lock bar 16 as shown in FIG. 13, so that no further clockwise rotation is possible for the lock bar 10.

In FIG. 18, when the lock bar 10 rotates clockwise from the position shown in FIG. 5, a phase is attained at point D in which the forward end of the lock arm 10c abuts against the lock bar 16. At point E, a phase is attained in which the second lock section 10b of the lock bar 10 is locked by the second lock section 12b of the lock member 12. At point F, the driving section 14c of the driving lever 14 pushes the driven pin 6c of the opening/closing shaft 6, so that the movable light shield door 2d of the cartridge 2 starts to be opened. The movable light shield door 2d of the cartridge 2 is completely opened at the stop position for the pin. Thus, as shown in FIG. 12, when the back cover 3 is opened somewhere between the first lock point and point D, the engagement between the forward end of the lock arm 10c and the lock bar 16 is released at point A of FIG. 17, so that the lock bar 10 rotates clockwise until it stops at the second lock position at point E. At this time, the movable light shield door 2d is closed.

Thus, in the camera of this embodiment, when the back cover 3 is not completely closed and the cartridge chamber 4 is not maintained shielded from light, the movable light shield door 2d is always closed, so that the danger of the film in the film cartridge 2 being inadvertently exposed is completely eliminated.

As described above, the camera of this embodiment is equipped with a movable light shield door opening/closing device, wherein the movable light shield door is enabled to be opened or closed when the cartridge chamber is in the accommodating position and wherein, when the cartridge chamber is at a position other than the accommodating position, the opening of the movable light shield door is prohibited. Thus, it is possible to eliminate the danger of the movable light shield door being opened when the cartridge is in the taking-out position, so that it is possible to completely prevent the unused film in the cartridge from being exposed during the loading/unloading of the cartridge, thereby providing a practical camera which allows use of this type of cartridge.

The present invention is also applicable to apparatuses using a cartridge having a movable light shield door of a type other than the one described above or a cartridge equipped with such a door.

Further, the present invention is applicable to apparatuses using an image recording medium other than films.

Moreover, the present invention is also applicable to apparatuses using a cartridge of a type other than the one described above or a cartridge having an image recording medium other than a film. Further, the present invention is also applicable to apparatuses using other types of cartridges or to apparatuses loaded with some other unit than cartridges.

Furthermore, in the present invention, it is possible to form one apparatus by entirely or partly adopting the structure according to the claims or to the embodiments. Further, the construction of the present invention may be combined with some other apparatus or constitute a component of an apparatus.

Further, the present invention is applicable to various types of cameras including single-lens reflex cameras, lens shutter cameras, video cameras, etc. Further, the present invention is also applicable to optical apparatuses other than cameras or other kinds of apparatuses, or to apparatuses applicable to such optical apparatuses other than cameras or other kinds of apparatuses, or components of such apparatuses.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus adapted to use an image recording medium cartridge having a cover for allowing an image recording medium in the cartridge to be thrust out from the image recording medium cartridge, said apparatus comprising:
   (A) a movement device movable with a cartridge so as to move the cartridge to a position for unloading the cartridge;
   (B) a cover operation device which opens the cover of the cartridge; and
   (C) a linkage device which restricts an opening operation of the cover of the cartridge by said cover operation device when said movement device is in the position for unloading the cartridge.

2. An apparatus according to claim 1, wherein said cover operation device moves with said movement device.

3. An apparatus according to claim 1, wherein said linkage device comprises a structure that allows said cover operation device to open the cover of the cartridge after said movement device reaches a position for loading the cartridge.

4. An apparatus according to claim 1, further comprising a holding device that prevents said movement device from moving to the position for unloading the cartridge until the cover of the cartridge is closed.

5. An apparatus according to claim 1, wherein the image recording medium comprises a film.

6. An apparatus according to claim 1, wherein said linkage device comprises a prevention device which prevents said cover operation device from opening the cover of the cartridge when said movement device is in the position for unloading the cartridge.

7. An apparatus according to claim 6, wherein said linkage device comprises a releasing device which releases said prevention device in response to said movement device moving to a position for loading the cartridge.

8. An apparatus according to claim 7, further comprising a holding device which holds said movement device in the position for loading the cartridge in response to a releasing of said prevention device.

9. An apparatus according to claim 8, further comprising a causing device which causes said cover operation device to open the cover of the cartridge in response to the releasing of said prevention device.

10. An apparatus according to claim 7, further comprising a causing device which causes said cover operation device to open the cover of the cartridge in response to a releasing of said prevention device.

11. An apparatus according to claim 8, further comprising a causing device which causes said cover operation device to close the cover of the cartridge in response to a releasing of said holding device.

12. An apparatus according to claim 1, wherein said movement device comprises a loading device which loads a cartridge.

13. An apparatus according to claim 1, wherein said movement device comprises a cartridge chamber.

14. An apparatus according to claim 1, wherein said apparatus comprises a camera.

15. An apparatus adapted to use an image recording medium cartridge having a cover for allowing an image recording medium in the cartridge to be thrust out from the image recording medium cartridge, said apparatus comprising:
   (A) a movement device movable with a cartridge so as to move the cartridge to a position for loading the cartridge;
   (B) a cover operation device which opens the cover of the cartridge; and
   (C) a linkage device which causes said cover operation device to open the cover of the cartridge after said movement device moves to the position for loading the cartridge.

16. An apparatus according to claim 15, wherein said cover operation device moves with said movement device.

17. An apparatus according to claim 15, wherein said linkage device comprises a structure that prevents said cover operation device from opening the cover of the cartridge until said movement device reaches the position for loading the cartridge.

18. An apparatus according to claim 15, further comprising a holding device that prevents said movement device from moving to a position for unloading the cartridge until the cover of the cartridge is closed.

19. An apparatus according to claim 15, wherein the image recording medium comprises a film.

20. An apparatus according to claim 15, wherein said linkage device comprises a lock that prevents said cover operation device from opening the cover of the cartridge when said movement device is in a position for unloading the cartridge.

21. An apparatus according to claim 20, wherein said linkage device comprises a lock release mechanism that releases said lock in response to said movement device being moved to the position for loading the cartridge.

22. An apparatus according to claim 21, further comprising a holding device that holds said movement device in the position for loading the cartridge in response to a releasing of said lock.

23. An apparatus according to claim 22, further comprising a causing device that causes said cover operation device to open the cover of the cartridge in response to the releasing of said lock.

24. An apparatus according to claim 21, further comprising a causing device that causes said cover operation device to open the cover of the cartridge in response to a releasing of said lock.

25. An apparatus according to claim 22, further comprising a causing device that causes said cover operation device to close the cover of the cartridge in response to a releasing of said holding device.

26. An apparatus according to claim 15, wherein said movement device comprises a loading device which loads a cartridge.

27. An apparatus according to claim 15, wherein said movement device comprises a cartridge chamber.

28. An apparatus according to claim 15, wherein said apparatus comprises a camera.

29. An apparatus adapted to use an image recording medium cartridge having a cover for allowing an image recording medium in the cartridge to be thrust out from the image recording medium cartridge, said apparatus comprising:
   (A) a movement device movable with a cartridge so as to move the cartridge to a position for unloading the cartridge;
   (B) a cover operation device which closes the cover of the cartridge; and
   (C) a linkage device which causes said cover operation device to close the cover of the cartridge before said movement device moves to the position for unloading the cartridge.

30. An apparatus according to claim 29, wherein said cover operation device moves with said movement device.

31. An apparatus according to claim 29, wherein said linkage device comprises a structure that allows said cover operation device to open the cover of the cartridge after said movement device reaches a position for loading the cartridge.

32. An apparatus according to claim 29, further comprising a holding device that prevents said movement device from moving to the position for unloading the cartridge until the cover of the cartridge is closed.

33. An apparatus according to claim 29, wherein the image recording medium comprises a film.

34. An apparatus according to claim 29, wherein said linkage device comprises a lock that prevents said cover operation device from opening the cover of the cartridge when said movement device is in the position for unloading the cartridge.

35. An apparatus according to claim 34, wherein said linkage device comprises means for releasing said lock in response to said movement device being moved to a position for loading the cartridge.

36. An apparatus according to claim 35, further comprising a holding device that holds said movement device in the position for unloading the cartridge in response to a releasing of said lock.

37. An apparatus according to claim 36, further comprising a causing device that causes said cover operation device to open the cover of the cartridge in response to a releasing of said lock.

38. An apparatus according to claim 35, further comprising a causing device that causes said cover operation device to open the cover of the cartridge in response to a releasing of said lock.

39. An apparatus according to claim 36, further comprising a causing device that causes said cover operation device to close the cover of the cartridge in response to a releasing of said holding device.

40. An apparatus according to claim 29, wherein said movement device comprises a loading device which loads a cartridge.

41. An apparatus according to claim 29, wherein said movement device comprises a cartridge chamber.

42. An apparatus according to claim 29, wherein said apparatus comprises a camera.

43. An apparatus adapted to use an image recording medium cartridge having a light shield portion, said camera comprising:
   (A) a movement device movable with a cartridge so as to move the cartridge to a Position for unloading the cartridge;
   (B) a light shield portion operation device which operates the light shield portion of the cartridge; and (C) a linkage device which restricts operation of the light shield portion of the cartridge by said light shield portion operation device when said movement device is in the position for unloading the cartridge.

44. An apparatus according to claim 43, wherein said light shield portion operation device moves with said movement device.

45. An apparatus according to claim 43, wherein said linkage device comprises a structure that allows said light shield portion operation device to operate the light shield portion of the cartridge after said movement device reaches a position for loading the cartridge.

46. An apparatus according to claim 43, further comprising a holding device that prevents said movement device from moving to the position for unloading the cartridge until the light shield portion of the cartridge is closed.

47. An apparatus according to claim 43, wherein the image recording medium comprises a film.

48. An apparatus according to claim 43, wherein said linkage device comprises a lock that prevents said light shield portion operation device from opening the light shield portion of the cartridge when said movement device is in the position for unloading the cartridge.

49. An apparatus according to claim 48, wherein said linkage device comprises means for releasing said lock in response to said movement device being moved to a position for loading the cartridge.

50. An apparatus according to claim 49, further comprising a holding device that holds the movement device in the position for loading the cartridge in response to a releasing of said lock.

51. An apparatus according to claim 50, further comprising a causing device that causes said light shield portion operation device to open the light shield portion of the cartridge in response to the releasing of said lock.

52. An apparatus according to claim 49, further comprising a causing device that causes the light shield portion operation device to open the light shield portion of the cartridge in response to a releasing of said lock.

53. An apparatus according to claim 49, further comprising a causing device that causes the light shield portion operation device to close the light shield portion of the cartridge in response to a releasing of said holding device.

54. An apparatus according to claim 43, wherein said movement device comprises a loading device which loads a cartridge.

55. An apparatus according to claim 43, wherein said movement device comprises a cartridge chamber.

56. An apparatus according to claim 43, wherein said apparatus comprises a camera.

57. An apparatus adapted to use an image recording medium cartridge having a light shield portion, said apparatus comprising:
(A) a movement device movable with a cartridge so as to move the cartridge to a position for loading the cartridge;
(B) a light shield portion operation device which operates the light shield portion of the cartridge; and
(C) a linkage device which causes said light shield portion operation device to operate the light shield portion of the cartridge after said movement device moves to the position for loading the cartridge.

58. An apparatus according to claim 57, wherein said light shield portion operation device moves with said movement device.

59. An apparatus according to claim 57, wherein said linkage device comprises means for allowing said light shield portion operation device to operate the light shield portion of the cartridge after said movement device reaches the position for loading the cartridge.

60. An apparatus according to claim 57, further comprising a holding device that prevents said movement device from moving to a position for unloading the cartridge until the light shield portion of the cartridge is closed.

61. An apparatus according to claim 57, wherein said image recording medium comprises a film.

62. An apparatus according to claim 61, wherein said linkage device comprises a lock that prevents the light shield portion operation device from opening the light shield portion when said movement device is in a position for unloading the cartridge.

63. An apparatus according to claim 62, wherein said linkage device comprises means for releasing said lock in response to said movement device being moved to the position for loading the cartridge.

64. An apparatus according to claim 63, further comprising a holding device that holds said movement device in the position for loading the cartridge in response to a releasing of said lock.

65. An apparatus according to claim 64, further comprising a causing device that causes said light shield portion operation device to open the light shield portion in response to the releasing of said lock.

66. An apparatus according to claim 63, further comprising a causing device that causes said light shield portion operation device to open the light shield portion in response to a releasing of said lock.

67. An apparatus according to claim 64, further comprising a causing device that causes said light shield portion operation device to close the light shield portion in response to a releasing of said holding device.

68. An apparatus according to claim 57, wherein said movement device comprises a loading device which loads a cartridge.

69. An apparatus according to claim 57, wherein said movement device comprises a cartridge chamber.

70. An apparatus according to claim 57, wherein said apparatus comprises a camera.

71. An apparatus adapted to use an image recording medium cartridge having a light shield portion, said apparatus comprising:
(A) a movement device movable with a cartridge so as to move the cartridge to a position for unloading the cartridge;
(B) a light shield portion operation device which closes the light shield portion of the cartridge; and
(C) a linkage device which causes said light shield portion operation device to close the light shield portion before said movement device moves to the position for unloading the cartridge.

72. An apparatus according to claim 71, wherein said light shield portion operation device moves with said movement device.

73. An apparatus according to claim 71, wherein said linkage device comprises means for allowing said light shield portion operation device to open the light shield portion after said movement device reaches a position for loading the cartridge.

74. An apparatus according to claim 71, further comprising a holding device that prevents said movement device from moving to the position for unloading the cartridge until the light shield portion of the cartridge is closed.

75. An apparatus according to claim 71, wherein the image recording medium comprises a film.

76. An apparatus according to claim 71, wherein said linkage device comprises a lock that prevents said light shield portion operating device from opening the light shield portion of the cartridge when said movement device is in the position for unloading the cartridge.

77. An apparatus according to claim 76, wherein said linkage device comprises a release mechanism that releases said lock in response to said movement device being moved to the position for loading the cartridge.

78. An apparatus according to claim 77, further comprising a holding device that holds said movement device in the position for loading the cartridge in response to a releasing of said lock.

79. An apparatus according to claim 78, further comprising a causing device that causes said light shield portion operation device to open the light shield portion of the cartridge in response to the releasing of said lock.

80. An apparatus according to claim 77, further comprising a causing device that causes said light shield portion operation device to open the light shield portion of the cartridge in response to a releasing of said lock.

81. An apparatus according to claim 78, further comprising a causing device that causes said light shield portion operation device to close the light shield portion of the cartridge in response to a releasing of said holding device.

82. An apparatus according to claim 71, wherein said movement device comprises a loading device which loads a cartridge.

83. An apparatus according to claim 71, wherein said movement device comprises a cartridge chamber.

84. An apparatus according to claim 71, wherein said apparatus comprises a camera.

* * * * *

UNITED STATES PATENT AND TRADEMARK OFFICE
CERTIFICATE OF CORRECTION

PATENT NO. : 5,826,125

DATED : October 20, 1998

INVENTOR(S): TETSUYA NISHIO

It is certified that error appears in the above-identified patent and that said Letters Patent is hereby corrected as shown below:

COLUMN 10,

Line 63, "Position" should read --position--.

Signed and Sealed this

First Day of June, 1999

*Attest:*

Q. TODD DICKINSON

*Attesting Officer*     Acting Commissioner of Patents and Trademarks